United States Patent [19]

Hatch et al.

[11] Patent Number: 5,061,367
[45] Date of Patent: Oct. 29, 1991

[54] WATER PURIFYING FILTER DEVICE

[75] Inventors: Gary L. Hatch, Sheboygan; Ralph A. Polasky, Ripon, both of Wis.

[73] Assignee: Ametek, Inc., Sheboygan, Wis.

[21] Appl. No.: 421,558

[22] Filed: Oct. 13, 1989

[51] Int. Cl.⁵ .................... B01D 27/02; C02F 9/00
[52] U.S. Cl. .................... 210/137; 210/149; 210/266; 210/282; 210/350
[58] Field of Search ........ 210/137, 149, 266, 282–284, 210/290, 501, 350

[56] References Cited

U.S. PATENT DOCUMENTS

| | | | |
|---|---|---|---|
| 3,327,859 | 6/1967 | Pall | 210/266 |
| 3,950,251 | 4/1976 | Hiller | 210/266 |
| 4,147,631 | 4/1979 | Deines et al. | 210/137 |
| 4,594,392 | 6/1986 | Hatch | 525/327.1 |
| 4,714,546 | 12/1987 | Solomon et al. | 210/137 |
| 4,764,274 | 8/1988 | Miller | 210/266 |
| 4,769,143 | 9/1988 | Deutsch et.al. | 210/266 |

Primary Examiner—Ivars Cintins
Attorney, Agent, or Firm—Andrus, Sceales, Starke & Sawall

[57] ABSTRACT

A filter cartridge for treating drinking water to remove a broad range of microorganisms includes a microbiocidal resin layer, a porous activated carbon filter element and a flow controller to assure a minimum effective residence time of water in the filter under varying pressure conditions. The microbiocidal resin preferably comprises a halogenated resin bed which is effective to kill a broad range of bacteria, viruses and protozoan cysts. The five micron carbon filter element removes any particularly resistant cysts which may have survived passage through the resin bed. The filter may also be provided with a scavenger resin downstream of the haogenated resin bed to remove any free halogens from the final effluent. A buffering resin may also be included upstream of the halogenated resin bed to precondition high pH supply water. Compensation for the decreased microbiocidal activity of the halogenated resin with decreasing supply water temperature may be provided by a temperature sensitive flow control valve which increasingly restricts the flow of supply water into the filter with decreasing water temperature.

17 Claims, 2 Drawing Sheets

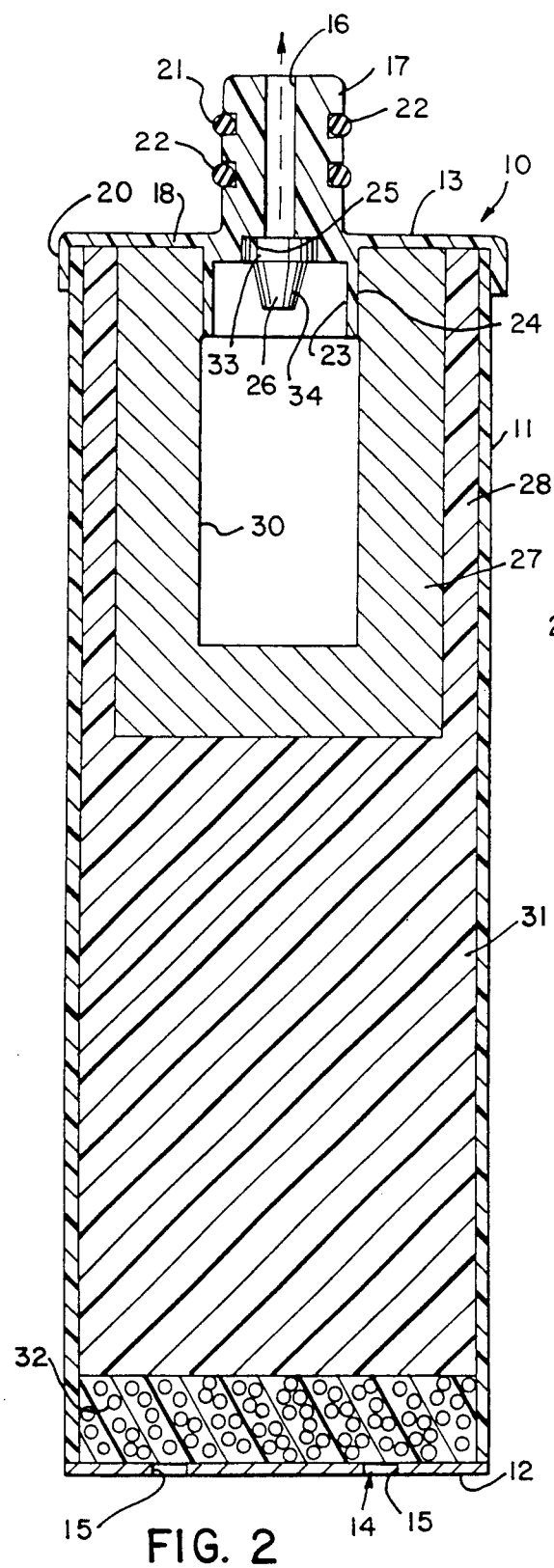
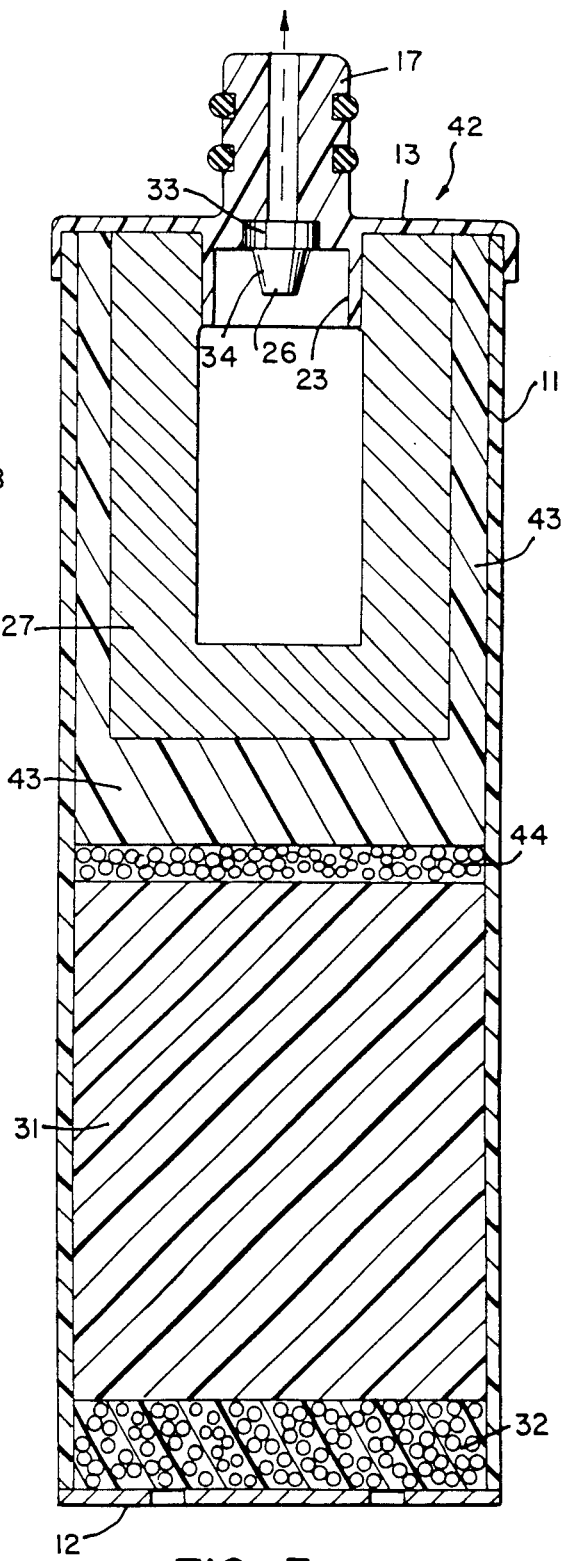

WATER PURIFYING FILTER DEVICE

BACKGROUND OF THE INVENTION

The present invention pertains to a filter for the purification of drinking water and, more particularly, to a filter particularly adapted for treating a domestic drinking water supply to remove a broad range of potentially harmful organisms, including bacteria, viruses and protozoan cysts.

Waterborne diseases are known to be caused by a wide variety of organisms, including bacteria, viruses and protozoa. In the treatment of drinking water supplies, these organisms are typically removed by a combination of disinfection and filtration. Thus, a broad range of disinfecting chemicals and filter media are known and used. Increasing concern over the contamination of certain surface and ground water supplies used as sources of drinking water have lead to a careful examination of conventional water treatment mechanisms to assure that pathogenic organisms of all types are effectively removed.

For some time, it has been suspected that disease-transmitting viruses may, in some instances, not be effectively removed in conventional water treatment systems. This may be attributable to either their resistance to disinfectants typically found effective to kill bacteria and other organisms or their small size which renders virtually all filter media ineffective to retain and remove viruses. In addition, waterborne diseases carried by bacteria and protozoa also remain a problem, particularly where polluted surface waters must be utilized and treated to supply drinking water.

A wide variety of relatively small filter units have been developed for home use or the like in treating drinking water which may have already been treated in a municipal treatment system. Such filters may be of a size adequate to treat all incoming water to a home or, more typically, a smaller size which may be attached directly to a faucet to provide an immediate source of supplementally treated drinking water. These small filters have used a variety of media to provide supplemental microbiocidal activity in an attempt to eliminate any kind of pathogenic organisms which may have survived municipal treatment. These media include activated carbon, semipermeable membranes, and a variety of disinfectants. In addition, these or other types of filter media are sometimes also utilized in small filter units to provide supplemental removal of other contaminants, such as heavy metals, and other dissolved and suspended gases and particulates.

The microbiocidal activity of silver and certain silver compounds is well known and these materials are often mixed with another filter media, such as activated carbon, to provide a combination of biocidal activity and mechanical filtration to remove a wide range of organisms. However, at the safe upper levels of silver typically allowed in drinking water filters, the microbiocidal activity is typically less than complete. Certain types of small pore activated carbon filters can effectively retain larger microorganisms such as protozoan cysts and some bacteria, but are totally ineffective against the very much smaller viruses. Even semipermeable membrane filters which may have the capability of retaining organisms and other particles as small as 0.2 micron, are also ineffective in retaining viruses.

A wide variety of disinfecting resins are also well known and widely used in filters for the treatment of drinking water. Those resins applied particularly to kill microbiological pathogens in water typically utilize halogenated anion exchange resins. One particularly effective disinfecting resin is an iodinated polyvinylpyridine resin of a type disclosed in U.S. Pat. No. 4,594,392.

U.S. Pat. No. 4,769,143 discloses a multimedia filter for purifying drinking water which includes one or more disinfecting media described as effective to kill bacteria in the drinking water supply. The bacteriacidal filter media disclosed in the foregoing patent include a mixed bed of crystalline iodine and an anion exchange resin, and a silver-impregnated activated carbon element. In addition, a semipermeable membrane element disposed between the resin and carbon media provides a supplemental mechanical filtration of bacteria not killed in the iodine/resin bed. However, the microbiocidal effectiveness of a typical halogenated disinfecting resin depends largely on the contact or residence time of the water to be treated in the resin media. Although contact time or residence may be simply a function of the size of the resin bed, practical considerations limit such size and, in the case of small filter units intended for household use and attachment to a single faucet, the volume available for the disinfecting resin is quite limited. Therefore, residence time of the water in the filter necessary to provide effective microbiocidal activity requires a limitation on the flow rate of the water through the filter unit. Obviously, if the filter unit is used in a water supply with wide fluctuations in supply pressure, higher system pressures may reduce the residence time of the water in the disinfecting media to a point where large numbers of organisms are unaffected and pass through the filter. Backup media, such as membranes or bacteriostatic carbon elements may help, but do not assure removal or kill of pathogenic organisms passing through the disinfecting resin bed. It is also known that decreasing supply water temperature decreases the disinfecting activity of the typical halogenated resin, such that effective microbiocidal activity may be lost with decreasing supply water temperature.

There is a need, therefore, for a small portable filter for the treatment of drinking water which will effectively remove a wide range of microorganic pathogens, including bacteria, viruses and protozoa or protozoan cysts. Such a filter unit should be effective over a wide range of supply water pressures. The use of a halogenated disinfecting resin should also include appropriate means for eliminating residual free halogens which may be flushed from the resin. The filter unit should also preferably be constructed to effectively treat water over an anticipated range of supply water temperature and of varying pH.

SUMMARY OF THE INVENTION

In accordance with the present invention, a drinking water purification filter is provided which provides an extremely high disinfecting capability for a wide range of pathogenic microorganisms, including bacteria, viruses and protozoan cysts. In its preferred embodiment, the filter comprises a small cartridge unit which is particularly adapted to be attached to a faucet to treat a normal supply of drinking water for personal or home use.

The filter cartridge includes an enclosing container having a feed water inlet and a treated water outlet. A microbiocidal resin, preferably comprising a halogenated resin, is placed in a portion of the container and an activated carbon filter element, preferably comprising a small pore bonded block of powdered activated carbon, is placed in the container downstream of the resin. The filter cartridge includes a flow control means which is responsive to the pressure of the supply water to provide a uniform and constant flow of water through the filter. This assures a minimum effective residence time of the water in the microbiocidal resin bed to assure effective kill of the organisms.

In a preferred form, the microbiocidal resin comprises an iodinated polyvinylpyridine resin. The resin is an effective bacteriacide and viruscide, and is also effective in killing protozoan cysts. However, particularly virulent cysts which may bypass the resin are retained and removed from the water by the porous carbon filter element.

The flow control means preferably comprises a pressure responsive flow restrictor in the filter outlet. The container for the filter cartridge includes an outlet end wall which defines the outlet opening and the flow restrictor is mounted in the inlet opening on the inside of the outlet end wall. The flow restrictor includes an annular retainer mounted in the outlet end wall and a flexible restrictor element mounted in the retainer and having an axial through bore which is aligned with the outlet opening. The flexible restrictor element has an outer wall which is exposed to the pressure of the water flowing through the filter container and is radially compressible to reduce the size of the through bore and, therefore, the flow of water through the outlet opening in direct proportion to increasing system pressure. Preferably, the outer wall of the restrictor element has a frustoconical shape to provide optimum active surface area.

The filter cartridge may include a scavenger resin which is disposed downstream of the halogenated microbiocidal resin to remove from the filtered water free halides which are released from the halogenated resin. The scavenger resin may comprise any suitable anion exchange resin or the like. Preferably, the anion exchange resin comprises a resin bed which is disposed directly adjacent the halogenated resin, but is maintained separated therefrom by a porous separator element.

The filter cartridge may also include a porous compressible retainer which is placed between the inside face of the inlet end wall and the halogenated or other microbiocidal resin layer. The porous compressible retainer compensates for growth or shrinkage in the resin bed or beds and preferably comprises a layer of an open cell plastic material such as polyester or polyurethane foam.

In order to handle high pH supply water, the filter cartridge may also include a buffering resin placed in the container upstream of the halogenated resin. The buffering resin may comprise any suitable cation exchange resin.

To compensate for the decrease in microbiocidal activity of a typical halogenated resin as the temperature of the water supply to be treated decreases, a temperature responsive flow controller may be utilized to decrease the flow of water through the filter in response to decreasing water temperature. In one embodiment, a temperature responsive bi-metal element is utilized.

BRIEF DESCRIPTION OF THE DRAWINGS

FIG. 2 is a sectional view through a filter cartridge of the present invention.

FIG. 3 is a sectional view similar to FIG. 2 showing an alternate embodiment of the invention.

DETAILED DESCRIPTION OF THE PREFERRED EMBODIMENT

Figure 1:
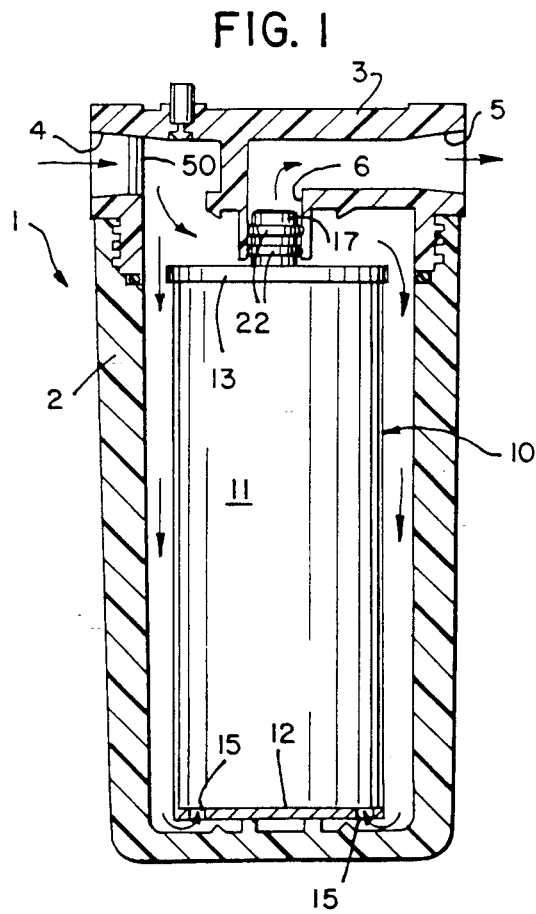
FIG. 1 is a sectional view showing the general arrangement of a disposable filter cartridge of the present invention inside its housing.

Referring initially to FIGS. 1 and 2, a filter in accordance with the most basic aspect of the present invention comprises a cartridge 10 which is intended to be inserted into an enclosing housing 1 (FIG. 4) from which it can be removed and disposed of after reaching its effective life. The cartridge 10 includes a filter container 11, preferably of cylindrical shape, which is closed at its opposite ends by an inlet end cap 12 and an outlet end cap 13. The inlet end cap 12 comprises a generally flat circular plate including an appropriate supply water inlet 14 which, as shown, comprises a series of small holes 15. The outlet end cap 13 includes a centrally disposed hub 17 defining an axially extending outlet opening 16. The outlet end cap 13 includes an end plate 18 integral with the central hub 17 and having a flanged outer edge 20 adapted to fit snuggly over the adjacent end of the container 11. The outlet end cap 13 may be sealed to the container 11 by any suitable method providing a water tight seal, including hot melt adhesives, solvent bonding, or sonic welding. Before the outlet end cap 13 is attached to the cylindrical container 11, certain other cartridge components are attached to the outlet end cap.

The outlet end cap hub 17 includes a pair of annular grooves 21 in the outside surface thereof. Each of the grooves is adapted to receive and hold an O-ring 22, which O-rings are adapted to provide a seal between the cartridge 10 and a cylindrical opening 6 in the cover 3 of the cartridge housing 1. The double O-ring seal is particularly desirable and effective to prevent microorganism by-pass and, in particular, to prevent the by-pass of viruses.

Referring particularly to FIG. 1, the outer housing 1 for the filter cartridge 10 includes a generally cylindrical sump 2 having a closed lower end and a cover 3 which is threadably attached to the sump. The cover 3 includes a housing inlet 4 by which raw water is directed to the filter cartridge 10 and a housing outlet 5 from which effluent from the filter cartridge is directed for consumption or use. After the new or replacement cartridge 10 is inserted into the open sump 2, the cover 3 is threaded into the sump 2 and, simultaneously, the cylindrical opening 6 in the cover slides over the O-rings 22 on the cartridge outlet end cap 13. The cartridge 10 is supported above the bottom interior of the sump 2 and raw water entering the housing inlet 4 passes downwardly through the space between the cartridge container 11 and the interior of the sump to enter the inlet opening holes 15 in the cartridge inlet end cap 12. Thus, the filter cartridge 10 is operated in a conventional up-flow mode with the raw water entering the bottom and the filtered effluent exiting the top.

Referring again to FIG. 2, extending inwardly of the outlet end cap 13 is an integral cup-shaped element 23 which is disposed coaxially with the hub 17 and the outlet opening 16. The cup-shaped element 23 is defined by an outer cylindrical wall 24. At the inner end of the outlet opening 16 is an enlarged circular recess 25 within which is secured a pressure responsive flow control element 26, the construction and operation of which will be described in greater detail hereinafter.

A cylindrical porous activated carbon filter element 27 is attached to the outlet end cap 13. The carbon filter element 27 comprises a well known construction of a resin-bonded powdered activated carbon which is typically formed under heat and compression to provide a microporous filter element having a capability of retaining particles as small as 1-3 microns and, more typically, 3-5 microns. The carbon filter 27 has a cylindrical OD smaller than the ID of the cylindrical container wall 11, leaving a substantial annular space 28 therebetween. The filter element has a cylindrical interior opening 30 which is closed at its axially inner end and opened adjacent the outlet opening 16 and flow control element 26. The interior opening 30 is sized to allow the element 27 to be slid over the outer cylindrical wall 24 of the cupshaped element 23 such that the end face of the element engages the inside surface of the end plate 18 of the outlet end cap 13. After the flow control element 26 has been inserted and fixed in the recess 25, the inside of the outlet end cap 13 may be coated with a suitable hot melt adhesive, the carbon filter element slid over the cup-shaped element 23 in engagement with the outer cylindrical wall 24 thereof, and the end cap subassembly attached and sealed to the container 11.

The interior of the container 11, after attachment of the outlet end cap subassembly, is substantially filled with a microbiocidal resin, preferably comprising an iodinated polyvinylpyridine resin of the type disclosed in U.S. Pat. No. 4,594,392. However, other similar types of resins possessing the capability of destroying a broad range of pathogenic organisms may also be used. The resin 31 may be in a conventional bead form and may have a typical 20×50 mesh size. It is contemplated, however, that the microbiocidal disinfecting resin 31 may comprise a powdered resin material formed into a bonded or sintered porous block, in a manner similar to the manufacture of the porous carbon filter element 27.

However, when a microbiocidal resin, such as the above identified halogenated resin, is used in loose granular or bead form, a suitable porous compressible retainer 32 is inserted between the bed of resin 31 and the inside face of the inlet end cap 12. Because typical resins are susceptible to swelling and/or shrinkage, depending upon the amount of water in contact therewith, the compressible retainer 32 accommodates such movement and retains the resin bed in a firmly packed condition. This helps avoid channeling and short-circuiting of supply water through the resin bed. The compressible retainer 32 is not intended to provide a filtering function and, therefore, may comprise a fairly large pore open cell plastic material, such as a polyester or polyurethane foam. After the container 11 is filled with the resin 31 and closed with the retainer 32, the inlet end cap 12 is attached to the container 11 by any suitable method, such as sonic welding.

In operation, the supply water to be disinfected enters the filter cartridge 10 through the inlet opening holes 15 and passes through the open cell retainer 32 and into contact with the halogenated resin bed 31. The halogenated resin bed provides an essentially demand release of a halogen or halogens which have been found to be effective to kill not only bacteria, but viruses and protozo or protozoa cysts as well. The porous carbon filter element 27 receives disinfected water directly from the bed of resin 31 and provides a broad range of supplemental filtering and absorption functions. Most importantly with respect to complete disinfection, the carbon filter element is effective to remove highly resistant protozoan cysts which may have survived passage through the resin bed. The carbon filter element also will remove the undesirable taste and odor imparted by active iodine or other halogens which are released by the microbiocidal resin 31. In addition, the carbon filter element 27 will also provide for an additional broad removal of solid and dissolved particulates and gases, and some of which may comprise potentially hazardous contaminants, as is well known in the art. Thus, the carbon filter element can provide the supplemental removal of heavy metals, asbestos fibers, other dissolved gases contributing to taste and odor, as well as a wide range of other organic or inorganic particles. The annular space 28 surrounding the carbon filter element 27 is filled with the resin 31 and thus provides an enhanced and substantially enlarged filter surface area to accommodate better flow through the carbon element and, therefore, through the filter cartridge. The size and shape of the carbon filter element reduces substantially the pressure drop through this small pore element. Because the porous carbon element is more susceptible to clogging than the resin 31, the greatly enhanced filter surface area provided in this construction maximizes the effectiveness of both the carbon element and the resin bed, resulting in an extended useful life of the filter cartridge 10.

Figure 5:
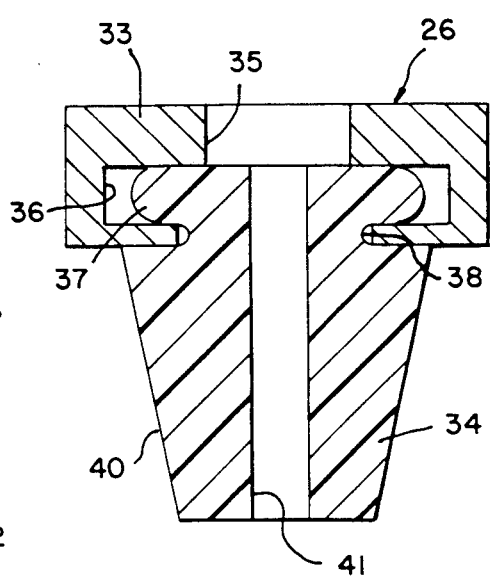
FIG. 5 is an enlarged sectional view through the pressure responsive flow restrictor used in each of the embodiments of the filter in accordance with the present invention.

Because the pressure of the water supplied to the filter cartridge may vary, as it does typically in any domestic water supply, the flow rate through the filter would ordinarily also vary. However, to provide most effective microbiocidal activity, the halogenated or other disinfecting resin 31 must provide adequate contact time to the water passing therethrough to assure virtual complete kill of potentially harmful microorganisms. If water supply system pressure becomes too great, the resulting increased flow rate may allow harmful microorganisms to by-pass the resin and, in the worst case, the downstream carbon filter element as well. Viruses are a particular concern because a porous carbon block filter element is largely ineffective to remove them, as are virtually all mechanical filter media which might be used in a filter cartridge of the type disclosed herein. Thus, the filter of the present invention includes a flow control element 26 which is responsive to changes in water pressure to maintain a constant flow of water through the filter. Referring also to FIG. 5, the flow control element 26 includes an annular retainer 33 adapted to be pressed into the recess 25 surrounding the outlet opening 16 in the outlet end cap 13. The annular retainer 33 may be secured with a press fit or may be alternately or supplementally secured with an adhesive, such as the hot melt adhesive used to fix the carbon filter element and the outlet end cap in place. The annular retainer may be made of a metal, such as brass, or a suitable hard, rigid plastic. The retainer includes a central opening 35 in alignment with the outlet opening 16. The annular retainer 33 has an undercut annular groove 36 which is adapted to receive one end of and hold a flexible restrictor element 34. The restrictor element 34 preferably comprises a synthetic rubber material, such as buna-N, which is soft enough (has a low enough durometer) to deflect under increasing supply water pressure.

The restrictor element 34 includes a reduced diameter flanged end 37 which is separated from the main body 40 by a narrow neck 38. The flanged end may be inserted into the undercut annular groove 36 in the retainer 33 to secure the restrictor element in place. The restrictor element 34 includes a through bore 41 in axial alignment with the opening 35 in the retainer 33 and the outlet opening 16, such that purified water leaving the carbon filter element 27 and passing into the interior opening 30 therein may flow directly through the bore 41, hole 35 and outlet opening 16 to exit the filter cartridge. The synthetic rubber material from which the flexible restrictor element 34 is made and the size of the through bore 41 are selected to provide a substantially constant flow rate through the filter cartridge which will assure adequate minimum residence time of the water in the resin 31 for complete microorganism kill. As supply water pressure increases and the flow rate tends to increase correspondingly, pressure on the outer surface of the body 40 will cause it to compress radially inwardly and reduce the size of the bore 41. The flow of water therethrough will be correspondingly reduced in direct proportion to increasing water pressure. The outer surface of the body 40 is preferably of a frustoconical shape which diverges axially inwardly from the outlet end. The frustoconical shape provides enhanced active surface area responsive to water pressure to provide the necessary flow control. In a typical filter cartridge having a nominal 2¾" diameter and 8¾" length, the flow rate is preferably maintained at approximately 0.5-0.6 gpm (1.9-2.3 liters per minute).

Referring to FIG. 3, the iodine or other halogens in their various forms which are typically released from the disinfecting resin 31 may not be completely or adequately absorbed by the carbon filter element 27. It may be desirable or necessary, therefore, to provide in the filter cartridge 42 a suitable scavenger resin 43 which will effectively remove iodine, iodides, triiodides and similar forms of other halogens which may be released from the halogenated resin 31. The scavenger resin may comprise any suitable type of anion exchange resin. A suitable mixed bed deionizing resin may also be used. The volume of the scavenger resin 43 may be substantially smaller than that of the disinfecting resin 31, as shown in FIG. 3. The scavenger resin volume should be sufficient to completely enclose the carbon filter element 27, including filling the annular space 28 surrounding it. However, applications requiring a high level of removal of iodine or other halogens released from the disinfecting resin 31 may require a much greater volume of scavenger resin, possibly even in excess of the volume of disinfecting resin. It is important to maintain complete separation of the disinfecting resin 31 and scavenger resin 43. Should the scavenger resin mix with the disinfecting resin, the microbiocidal activity of the latter could be diminished. Thus, a porous separator 44 is disposed in the cartridge container between the two resin beds. The separator 44 may comprise a rigid plastic screen or disc having a porosity just slightly less than the typical size of the resin beads. Thus, a 80×100 mesh separator 44 would be typically suitable. The construction of the filter cartridge 42 of FIG. 3 is otherwise identical to the cartridge 10 shown in FIG. 1 and identical elements are so numbered.

Figure 4:
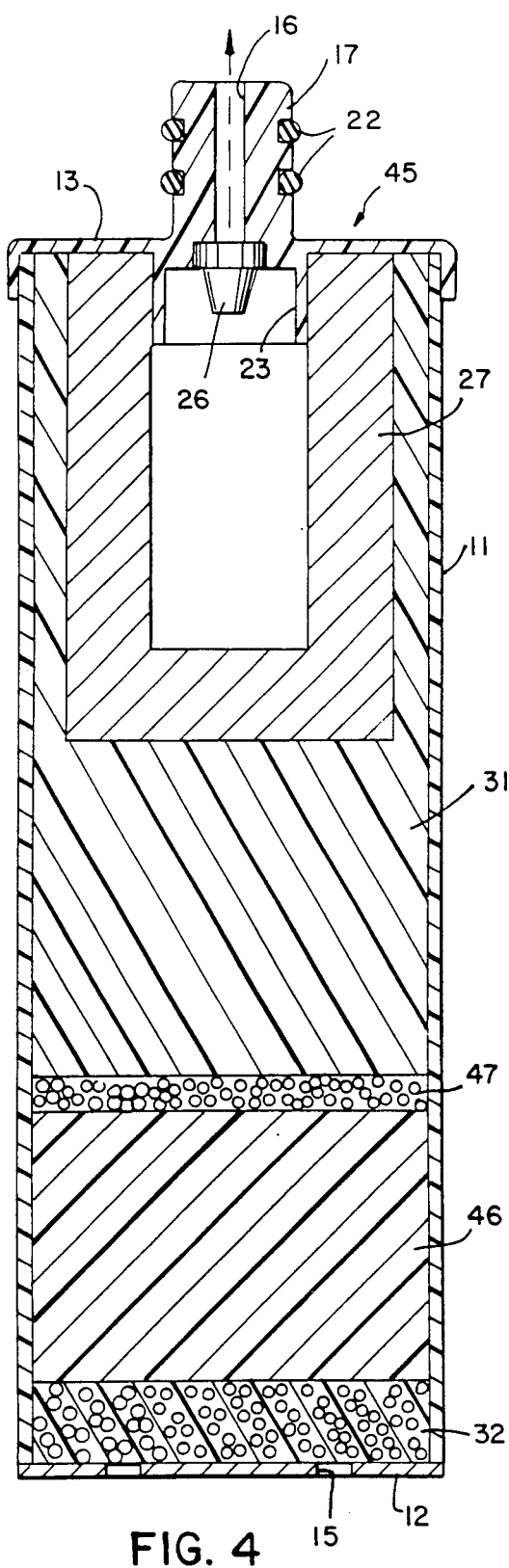
FIG. 4 is a sectional view similar to FIGS. 2 and 3 showing a further embodiment of the invention.

Referring now to FIG. 4, another embodiment of the filter cartridge of the present invention is shown. The cartridge 45 of the FIG. 4 embodiment is substantially identical to the cartridges shown in FIGS. 2 and 3 and identical parts are so numbered. It has been found, however, that in the presence of a highly alkaline supply water, e.g. having a pH of 9 or more, an excessive release of halogens from the disinfecting resin 31 is effected. This excessive release of halogens reduces the effective life of the filter and may also present an excess of free halogens which cannot be adequately handled by the carbon filter element 27 and/or a scavenger resin (43 in FIG. 3). Therefore, a buffering resin 46 is included in the filter cartridge 45 to lower the pH of the water reaching the downstream halogenated resin 31 and prevent the release of excess halogens. The buffering resin 46 may comprise a cation exchange resin and preferably, a weak acid cation resin in conventional bead form. Although a relatively smaller volume of buffering resin 46 is shown as compared to the disinfecting resin 31 in FIG. 4, certain conditions of high pH may require a substantially larger volume of buffering resin. As with the scavenger resin 43 of the FIG. 3 embodiment, the buffering resin 46 must be kept separated from the halogenated disinfecting resin 31 and a suitable separator 47 is inserted between the two beds. The separator 47 may be similar or identical to the separator 44 used in the FIG. 3 embodiment.

It is also possible and may be desirable to combine the features of the FIG. 3 and FIG. 4 embodiments to provide a filter cartridge having both a scavenger resin 43 and a buffering resin 46. As will be obvious from the construction of the two cartridges 42 and 45, the halogenated disinfecting resin 31 will be disposed between the scavenger resin 43 and the buffering resin 46 and maintained separated from each with appropriate separators 44 and 47, respectively.

Tests were run to determine the bacteriacidal efficiency of cartridges made pursuant to each of the construction shown in FIGS. 2-4. The following general procedures were used with the tests reported below.

The cartridges were supplied with general feed water using an on-off cycle time of 10% on-90% off. This cycle of time, ranging from 0.5 min. on-4.5 min. off to 1.5 min. on-13.5 min. off, was operated from 16 to 24 hours per day. The general feed water was dechlorinated tap water. The high pH (8.5)-high TDS (750 ppm) feed water was prepared by adding sodium hydroxide and sodium chloride. The cartridge life tests performed below were conducted using non-inocculated (coliform-free) general test water. At the "Gallons Through-Put" test points indicated, a 25-gallon volume of test water was inoculated with the coliform bacteria and passed through the cartridges. The coliform bacteria used in these tests was Klebsiella terrigena (ATCC#33257).

A filter cartridge 10 (FIG. 2) was prepared which contained 100% halogenated resin 31 as described in U.S. Pat. 4,594,392 having the formulation 10% $I_2$/90% IBr (500 mL); a 0.6 gpm flow controller 26; and a porous carbon filter element 27. The results are shown in Table 1.

TABLE 1

| Gallons Through-Put of General Feed Water[1] | Coliform Bacteria in Feed Water | Coliform Bacteria in Effluent Water[2] |
|---|---|---|
| 0 | 110,000/mL | <1/mL |
| 250 | 110,000/mL | <1/mL |
| 500 | 80,000/mL | <1/mL |
| 750 | 54,000/mL | <1/mL |

[1]General Feed Water was dechlorinated tap water (pH 7.2, 160 ppm TDS as NcCl) at 70° F.
[2]Effluent contained less than about 0.1–0.2 ppm free iodine (as $I_2$) through 750 gal.

A filter cartridge 42 (FIG. 3) was prepared, which contained 100% halogenated resin 31 as described in U.S. Pat. No. 4,594,392 having the formulation of 90% $I_2$/10% $ICl$ (500 mL); 155 mL of virgin anion exchange resin 43; a 0.6 gpm flow controller 26; and a porous carbon filter element 27. The results are shown in Table 2.

TABLE 2

| Gal. Through-Put | Gen. Feed Water[1] Temp. | Coliform Bacteria in Feed Water | Coliform Bacteria in Effluent Water[2] |
|---|---|---|---|
| 500 | 70° F. | 100,000/mL | <1/mL |
| 525 | 48° F. | 69,000/mL | <1/mL |

[1]General Feed Water was dechlorinated tap water altered to pH 8.5–9.0 and sodium chloride added to give 750 ppm TDS.
[2]Effluent at 500 gal. through-put contained <0.01 ppm free iodine.

Two filter cartridges 45 (FIG. 4) were prepared which contained 250 mL of weak acid cation exchange buffering resin 46; purifier resin 31 (from U.S. Pat. No. 4,594,392) which was 96% halogenated to 88% $I_2$/8% $IBr$ (350 mL); 0.5 gpm flow controller 26 and a porous carbon filter element 27. The results are shown in Table 3.

TABLE 3

| Cartridge | Gallons Through-Put | General Feed Water pH | General Feed Water TDS | General Feed Water Temp. | Coliform Bacteria in Feed Water | Coliform Bacteria in Effluent Water[2] |
|---|---|---|---|---|---|---|
| 1 | 500 | 8.5 | 750 | 70° F. | 88,000/mL | <1/mL |
| 2 | 500 | 7.2 | 160 | 70° F. | 90,000/mL | <1/mL |

[1]Cartridge 1 effluent pH ranged from 6.3 initially to 8.0 at 500 gal. Cartridge 2 effluent pH ranged from 6.0 initially to 7.1 at 500 gal. Free iodine in Cartridge 1 effluent ranged from 0 initially to 0.28 ppm through 500 gal. Free iodine in Cartridge 2 effluent ranged from 0 initially to 0.11 ppm through 500 gal.

From foregoing test results set forth in Tables 1–3, it will be seen that the filter cartridge constructions of the present invention are effective to kill virtually all water-borne bacteria of the type examined. In addition, the scavenger resin 43 used in the filter cartridge 42, the results of which are tabulated in Table 2, substantially reduced the free iodine in the effluent from the filter. Similarly, the buffering resin 46 in the filter cartridge 45, the results of which are shown in Table 3, reduced and effectively maintained the pH in the effluent and resulted in a free iodine content in the effluent at suitably low levels.

A halogenated disinfecting resin similar to that used in the foregoing tests for bacteriocidal efficiency, was also tested for viruscidal effectiveness. Table 4 shows the results of virus inactivation tests using two identical resin beds of the size indicated.

TABLE 4

Test of Disinfecting Iodine Resin for Virus Inactivation[1]

| Gallons of Feed Water Through Each Resin Bed[2] Bed #1 | Gallons of Feed Water Through Each Resin Bed[2] Bed #2 | Virus in Feed Water (counts/mL) | Virus in Effluent (counts/mL) Bed #1 | Virus in Effluent (counts/mL) Bed #2 | Average % Reduction |
|---|---|---|---|---|---|
| 0.78 | 0.84 | 50,119 | 5 | 6 | 99.99% |
| 14.9 | 15.0 | 44,668 | <1 | <1 | >99.99% |
| 24.8 | 25.0 | 52,481 | 2 | 3 | >99.99% |
| 43.8 | 44.9 | 37,154 | <1 | <1 | >99.99% |
| 68.2 | 69.3 | 29,512 | 2 | <1 | >99.99% |
| 72.5 | 73.6 | 50,119 | 2 | 2 | >99.99% |
| 85.2 | 86.3 | 12,589 | 32 | 17 | 99.81% |
| 89.2[3] | 90.5[3] | 10,233 | 36 | 13 | 99.78% |

[1]Virus: Coliphage MS-2; Resin: iodinated polyvinylpyridine according to U.S. Pat. No. 4,594,392.
[2]Resin Bed dimensions: 1-5/16" (3.33 cm) dia. × 5-5/8" (14.20 cm) long.
[3]The pH of the feed water for these samples was lowered to 5.3 to test the effect of low pH on the kill efficiency.

Test Conditions: Water Temperature—68°–75° F.; pH—7.3; TDS=785 mg/L (as NaCl); Flow Rate=350 mL/min. ±10 mL/min.; Turbidity= 0.5 NTU.

Virtual complete inactivation or virus kill was effected in the tests of both beds.

Tests were also run to determine the efficacy of the porous carbon filter element 27 in the removal of cyst-size particles. A filter block of bonded activated carbon of the type described hereinabove, was supplied with water containing latex spheres having a five micron diameter to simulate amoebic cysts. Table 5 shows the results of tests on three separate carbon filter elements.

TABLE 5

Cyst Removal Capability of the Porous Carbon Filter Element

| Porous Carbon Block Element # | Spheres/L in Feed | % Removal |
|---|---|---|
| 1 | 3.13 × 10⁵ | 99.977 |
| 2 | 3.95 × 10⁵ | 99.969 |
| 3 | 3.64 × 10⁵ | 99.983 |

The average removal from the three tests shown in Table 5 is 99.976% which meets Standard No. 53 for cyst removal established the National Sanitation Foundation.

As indicated previously, the biocidal efficiency of a halogenated resin material is reduced with decreasing temperature of the feed water. In such cases, the residence time of the water in the filter may have to be increased to maintain the desired level of microorganism kill efficiency. Therefore, it may be desirable to include a temperature responsive flow control device 50, preferably in the inlet flow path to the filter cartridge 10 (see FIG. 1). The temperature responsive device 50 may be mounted directly in the housing inlet 4 for immediate response to water temperature changes. The temperature responsive controller may comprise, for example, a bi-metal element effective to close (or open) a flow passage therethrough in response to temperature changes in the supply water.

Various modes of carrying out the present invention are contemplated as being within the scope of the following claims particularly pointing out and distinctly claiming the subject matter which is regarded as the invention.

We claim:

1. A filter for the purification of a supply of drinking water comprising:
   a filter-enclosing container having a water inlet and a water outlet;
   a microbiocidal resin filling a portion of the container;
   an activated carbon filter element within the container downstream of said resin;
   flow control means responsive to the pressure of the water supply for providing a uniform flow rate of water through the filter and for assuring a minimum effective residence time of the water in the microbiocidal resin bed; and,
   temperature responsive means operatively connected to said water inlet for decreasing the flow of water therethrough in response to decreasing temperature of the water supply.

2. The filter as set forth in claim 1 wherein said microbiocidal resin comprises a halogenated resin.

3. The filter as set forth in claim 2 wherein said resin comprises an iodinated polyvinylpyridine resin.

4. The filter as set forth in claim 2 including a scavenger resin filling a portion of the container downstream of said halogenated resin.

5. The filter as set forth in claim 4 wherein said scavenger resin comprises an anion exchange resin.

6. The filter as set forth in claim 5 wherein said anion exchange resin comprises a resin bed disposed adjacent said halogenated resin and maintained separated therefrom by a porous separator element.

7. The filter as set forth in claim 2 including a buffering resin filling a portion of the container upstream of said hologenated resin.

8. The filter as set forth in claim 7 wherein said buffering resin comprises a cation exchange resin.

9. The filter as set forth in claim 1 wherein said flow control means comprises a pressure responsive flow restrictor in the outlet.

10. A filter for the purification of a supply of drinking water comprising:
    a cylindrical filter-enclosing container having an inlet end wall on one end defining a water inlet and an outlet end wall on the other end defining a water outlet;
    a microbiocidal resin filling a portion of the container;
    a cylindrical activated carbon filter element within the container downstream of said resin adjacent said outlet end wall and in communication with the water outlet;
    said filter element having an outside diameter substantially smaller than the inside diameter of said container to define therebetween an annular space for a portion of said resin;
    said filter element having an axial counterbore opening to said water outlet, which counterbore is sized to define an integral annular wall and end wall in said element of substantially uniform thickness; and
    flow control means responsive to the pressure of the water supply for providing a uniform flow rate of water through the filter and for assuring a minimum effective residence time of the water in the microbiocidal resin bed.

11. The filter as set forth in claim 10 wherein said carbon filter element comprises a bonded block of powdered activated carbon.

12. The filter as set forth in claim 11 wherein said carbon block has a porosity effective to retain particles having a nominal 5 micron size.

13. A filter for the purification of a supply of drinking water comprising:
    a cylindrical filter-enclosing container having an inlet end wall on one end defining a water inlet and an outlet end wall on the other end defining a water outlet;
    a microbiocidal resin filling a portion of the container;
    an activated carbon filter element within the container downstream of said resin; and,
    means for compensating for changes in volume of said resin, said compensating means comprising porous compressible retainer means disposed between the resin and a container wall for expansion and compression in response to corresponding shrinkage and swelling of said resin, whereby channeling and short-circuiting of water through the resin bed is minimized.

14. The filter as set forth in claim 13 wherein said porous compressible retainer means is disposed with the container between the inlet end wall and said microbiocidal resin.

15. The filter as set forth in claim 14 wherein said porous compressible retainer comprises a layer of open cell plastic material.

16. The filter as set forth in claim 15 wherein the open cell plastic material is selected from the group consisting of polyester and polyurethane.

17. A filter for the removal of pathogenic microorganisms from a drinking water supply comprising:
    a filter-enclosing container having a water inlet and a water outlet;
    a microbiocidal resin filling a portion of the container;
    an activated carbon filter element within the container downstream of the resin and adjacent the outlet;
    porous compressible retainer means within the container in contact with the resin for expansion and compression in response to volumetric changes in the resin during use;
    pressure responsive flow control means for providing a uniform rate of flow of water through the filter in response to changes in the pressure of the water supply; and,
    temperature responsive flow control means for decreasing the rate of flow of water through the filter in response to changes in the temperature of the water supply.

* * * * *